United States Patent
Klassen et al.

(10) Patent No.: US 6,769,749 B2
(45) Date of Patent: Aug. 3, 2004

(54) SWITCHGEAR CABINET WITH A RACK AND PANEL ELEMENTS

(75) Inventors: Samuel Klassen, Haiger (DE); Heiko Holighaus, Eschenburg (DE)

(73) Assignee: Rittal RCS Communication, Haiger (DE)

( * ) Notice: Subject to any disclaimer, the term of this patent is extended or adjusted under 35 U.S.C. 154(b) by 29 days.

(21) Appl. No.: 10/102,600

(22) Filed: Mar. 20, 2002

(65) Prior Publication Data

US 2002/0175604 A1 Nov. 28, 2002

(30) Foreign Application Priority Data

Mar. 21, 2001 (DE) .......................................... 10 13 923

(51) Int. Cl.[7] .............................................. A47G 29/00
(52) U.S. Cl. .................................................. 312/265.3
(58) Field of Search ........................... 312/265.1, 265.2, 312/265.3, 265.4, 265.5, 257.1; 211/182, 183, 189, 26; 361/829

(56) References Cited

U.S. PATENT DOCUMENTS

| | | | | |
|---|---|---|---|---|
| 5,772,296 A | * | 6/1998 | Hartel et al. | 312/265.1 |
| 5,930,972 A | * | 8/1999 | Benner et al. | 52/653.1 |
| 5,971,511 A | * | 10/1999 | Diebel et al. | 312/265.3 |
| 5,992,646 A | * | 11/1999 | Benner et al. | 211/26 |
| 6,030,063 A | * | 2/2000 | Benner | 312/265.1 |
| 6,120,206 A | * | 9/2000 | Benner et al. | 403/231 |
| 6,231,142 B1 | * | 5/2001 | Pochet | 312/265.3 |
| 6,273,533 B1 | * | 8/2001 | Nicolai et al. | 312/265.1 |

FOREIGN PATENT DOCUMENTS

| | | | | |
|---|---|---|---|---|
| DE | 4036664 A1 | * | 5/1992 | A47B/96/00 |
| EP | 751595 A2 | * | 1/1997 | H02B/1/30 |
| JP | 11332031 A | * | 11/1999 | H02B/1/30 |

OTHER PUBLICATIONS

Copending Applications 10/102,177; 10/102,563; 10/102,178; 10/102,562 and 10/102,567 submitted by applicant.*

* cited by examiner

Primary Examiner—Lanna Mai
Assistant Examiner—John Fitzgerald
(74) Attorney, Agent, or Firm—Pauley Petersen & Erickson

(57) ABSTRACT

A switchgear cabinet with a cuboid rack assembled from frame legs, wherein free spaces are formed in areas of outer corner edges for receiving folded edges of meeting panel elements. If at least the folded edges of the vertical panel elements have at least two folded sections, which adjoin the panel elements whose insides are located directly, or via sealing elements, on the outer levels of the rack, and protrude into the free space of the facing frame leg, and the folded end sections extend parallel with respect to the median line of the outer levels meeting each other and their outsides are at the preset distance from the median line, then a transition which is symmetrical to the median line and has a narrow gap in the area of the outer corner edges and increased vandalism proofing is accomplished.

12 Claims, 1 Drawing Sheet

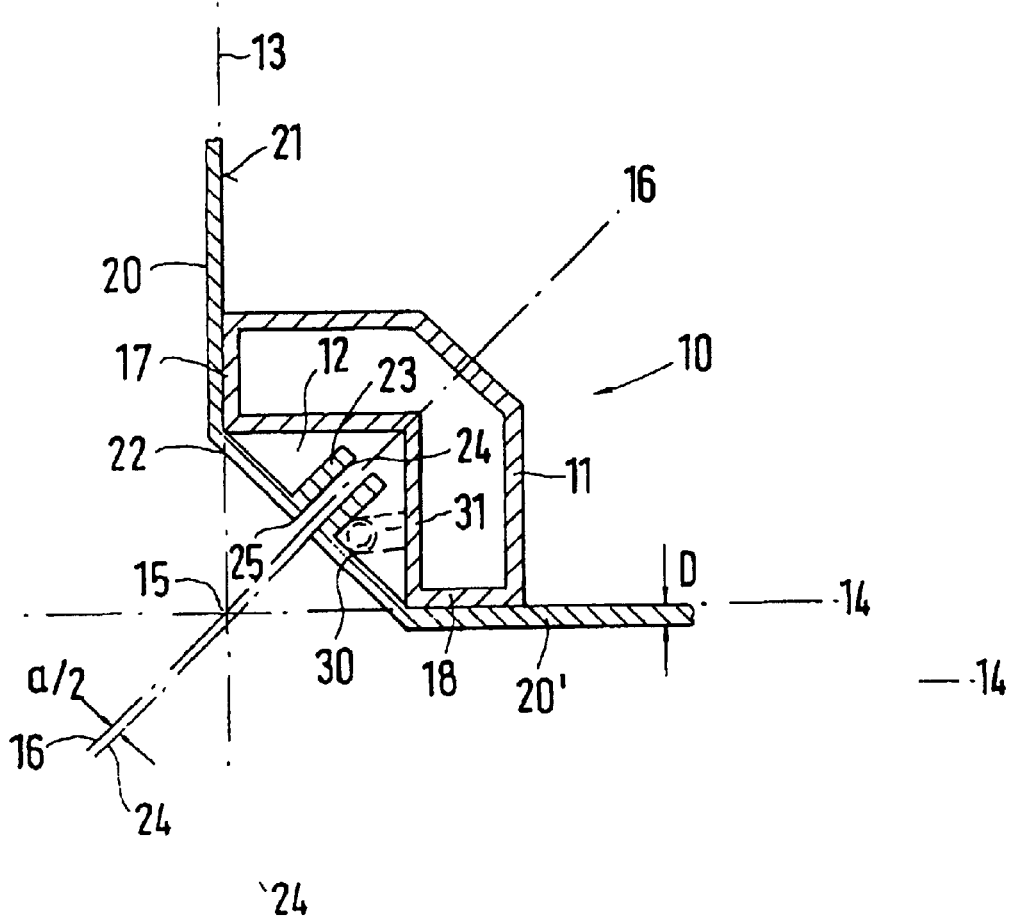

SWITCHGEAR CABINET WITH A RACK AND PANEL ELEMENTS

BACKGROUND OF THE INVENTION

1. Field of the Invention

This invention relates to a switchgear cabinet with a cuboid rack assembled from frame legs, wherein free spaces are formed in areas of outer corner edges for receiving folded edges of the panel elements meeting in the areas.

2. Description of Related Art

With known switchgear cabinets of this type, the edges of the panel elements are folded at right angles and project into the free spaces of the rack in the area of the outer corner edges. Here, a panel element with the folded edge is recessed with respect to the panel element which joins it vertically and is covered by it. The design of the areas of the outer corners of the switchgear cabinet has the advantage that when several switchgear cabinets are placed in a row, a generally closed front of the switchgear cabinet areas is created. Only a slit remains between the folded edge of the one panel element and the panel element meeting it at right angles. However, this results in a tool for forced removal of the panel elements and can be applied exactly in this slit. Therefore, often there is no sufficient assurance of preventing vandalism, in particular in connection with singly placed switchgear cabinets. Also, the panel elements and the cabinet doors cannot be freely combined at the vertical sides of the rack for achieving a uniform appearance and symmetry with respect to a median line of meeting sides in the area of all outer corner edges.

SUMMARY OF THE INVENTION

It is one object of this invention to provide folds of panel elements and cabinet doors of a switchgear cabinet, of the type previously mentioned, in an uniform manner in order to attach them freely in combinations, and to achieve a transition which is symmetrical with respect to the median line at all vertical outer edges.

In accordance with this invention this object is achieved with at least the folded edges of the vertical panel elements having at least two folded sections, which adjoin the panel elements with insides located directly, or via sealing elements, on the outer levels of the rack, and protrude into the free space of the facing frame leg. The folded end sections extend parallel with respect to the median line of the outer levels meeting each other and outsides are at a preset distance from the median line.

It is possible with such folds to fold the panel elements and cabinet doors similarly to achieve an appearance at all outer corner edges which is symmetrical in relation to the median line.

The folded end sections of the panel elements which meet each other form narrow gaps, at least in areas of all vertical outer corner edges, to which no tool for prying the panel elements out can be effectively applied. Moreover, these folded sections increase the strength of the edge area of the panel elements. It is possible to simply and decisively improve the vandalism proofing, particularly with a single cabinet.

In accordance with one embodiment, a first folded section adjoins the vertical side of the panel element, whose inside is set at an angle of 135° with respect to an inside of the panel element. The folded end section on the first folded section is folded inward at right angles. Folding the sides of a panel element offers no obstacles if produced in the form of a stamped-and-folded element.

The first folded section can also be folded multiple times and make a transition into the end section.

In accordance with a further embodiment, the layout can be such that the predetermined distance between the outsides of the folded end sections and the facing median line is less than the thickness of the panel elements.

The contact of the panel elements on the rack is assured because the levels of the insides of panel elements which meet each other intersect at the facing virtual outer corner edge.

Protection at the horizontal and the vertical virtual outer corner edges is achieved because the panel elements have edges folded on all four sides which, in the area of the corners of the panel elements, transition into correspondingly set-off edges located in the levels of the median lines of the panel elements and are preferably connected with each other. The edges can also be connected with each other, in particular welded, which additionally increases the strength of the panel element.

There is access to the interior of the switchgear cabinet because at least one panel element is embodied as a cabinet door. Hinge elements are attached on a vertical side of the cabinet door to the insides of the folded sections, while complementary hinge elements are fastened in the free space at the facing side of the frame leg. There is a compromise between the width of the gap between parallel extending folded end sections and the opening angle of the cabinet door because of the position of the hinge axes of the hinge and complementary hinge elements. Preferably, the opening angle should be greater than 90°, such as approximately 115°, in order to obtain unobstructed access to the interior of the switchgear cabinet.

BRIEF DESCRIPTION OF THE DRAWINGS

This invention is explained in greater detail in view of a horizontal partial cross section taken through a vertical corner area of the switchgear cabinet, as shown in the single drawing.

DESCRIPTION OF PREFERRED EMBODIMENTS

Panel elements 20 and 20' meet vertically in each corner area of the switchgear cabinet. A frame leg 11, which delimits a free space 12 in the direction toward the virtual outer corner edge 15, is assigned to all outer corner edges 15 of the rack 10. The frame legs 11 are embodied to be laterally reversed with respect to the median line 16, which extends between the associated outer levels 13 and 14 of the frame legs 11 and intersects them in the outer corner edge 15. The outer levels 13 and 14 are defined by the outsides of the contact profiled sides 17 and 18 of the frame legs 11 of the rack 10 and can be used for connecting the panel elements 20 and 20' with the frame legs 11 of the rack 10. The insides 21 of the panel elements 20 and 20' rest against the outsides of the contact profiled sides 17 and 18 and are therefore located on the outer levels 13 and 14 of the rack 10.

Following the contact profiled sides 17 and 18, the panel elements 20 and 20' transition into the folded sections 22 and 23. The inside of the first folded edge 15 extends at an angle of 135° with respect to the inside 21 of the associated panel element 20 or 20'. The folded end section 23, which is folded inward at right angles, is pushed against this first folded section 22. The folded end sections 23 extend at a predetermined distance a/2 parallel with the associated median line 16 and form a narrow gap of the width a, which is preferably less than a thickness D of the panel elements 20 and 20'. The transition area 25 from the first folded section 22 to the folded end section 23 is rounded. However, the gap remains so narrow that it is not possible to insert a tool or place a prying tool into this gap in order to provide the force required for prying loose the panel elements 20 and 20'.

But the first folded section 22 can also comprise several folded sections, which are arranged between the panel element 20 or 20' and the folded end section 23.

If the panel element 20' is embodied and used as a cabinet door, hinge elements are attached on one vertical side of the panel element 20' in the space between the insides of the first folded section 22 and the folded end section 23, which in a known manner are coupled with complementary hinge elements 31 fastened on a facing profiled side of the frame leg 11. Together with the width a of the gap, the hinge axis should be selected so that a sufficiently large opening angle for the cabinet door, along with the least possible width a of the gap is achieved. Closing elements and complementary closing elements are correspondingly arranged on the opposite side of the cabinet door.

It was already mentioned that the horizontal sides of the vertical panel elements 20 and 20' can have such folds. In that case the horizontal panel elements of the switchgear cabinet must also have on all sides folded edges 22, 23.

However, it is also conceivable to provide only the vertical sides of the vertical panel elements 20 and 20' with appropriate folds 22, 23, while the horizontal panel elements have edges folded at right angles.

On their free ends, the folded end sections 23 of the panel element 20 and 20' can also be bent toward the associated panel element, in order to stiffen the fold.

German Patent Reference 101 13 923.3-34 and its teachings are incorporated, by reference, into this specification.

What is claimed is:

1. In a switchgear cabinet having a cuboid rack assembled from frame legs, wherein free spaces are formed in areas of outer corner edges for receiving folded edges of meeting panel elements, the improvement comprising:

at least the folded edges of vertical panel elements (20, 20') having at least two folded sections (22 and 23) which adjoin the vertical panel elements (20, 20') having insides located one of directly and by way of sealing elements on outer virtual level lines (13, 14) of the rack (10), and protrude into the free space of the facing frame leg (11), and folded end sections (23) of the at least two folded end sections (22 and 23) extending parallel with respect to a virtual median line (16) of the outer levels virtual level lines (13, 14) meeting each other, and each of outsides (24) of the at least two folded sections (23) at a predetermined distance (a/2) from the virtual median line (16).

2. In the switchgear cabinet in accordance with claim 1, wherein the predetermined distance (a/2) between the outsides (24) of the folded end sections (23) and the facing virtual median line (16) is less than a thickness (D) of the panel elements (20, 20').

3. In the switchgear cabinet in accordance with claim 1, wherein the virtual level lines of insides (21) of the panel elements (20, 20') intersect at a facing virtual outer corner edge (15).

4. In the switchgear cabinet in accordance with claim 1, wherein at least one of the panel elements (20') is embodied as a cabinet door, and a hinge element (30) is attached on a vertical side of the cabinet door to an inside of the folded sections (22, 23), and complementary hinge elements (31) are fastened in the free space (12) at a facing side of the frame leg (11).

5. In the switchgear cabinet in accordance with claim 1, wherein the first folded section (22) of the edges of the panel elements (20, 20') comprises several folded sections.

6. In the switchgear cabinet in accordance with claim 1, wherein at free ends the end folded sections (23) are bent toward the associated panel elements (20, 20').

7. In the switchgear cabinet in accordance with claim 1, wherein a first folded section (22) adjoins a vertical side of one of the vertical panel elements (20, 20'), having an inside set at an angle of 135° with respect to an inside (21) of the one of the vertical panel elements (20, 20'), and one of the folded end sections (23) on the first folded section (22) folded inward at a right angle inward toward the facing frame leg (11).

8. In the switchgear cabinet in accordance with claim 7, wherein the predetermined distance (a/2) between the outsides (24) of the folded end sections (23) and the facing virtual median line (16) is less than a thickness (D) of the panel elements (20, 20').

9. In the switchgear cabinet in accordance with claim 8, wherein the virtual level lines of the insides (21) of the panel elements (20, 20') intersect at a facing virtual outer corner edge (15).

10. In the switchgear cabinet in accordance with claim 9, wherein at least one of the panel elements (20') is embodied as a cabinet door, and a hinge element (30) is attached on a vertical side of the cabinet door to an inside of the folded sections (22,23), and complementary hinge elements (31) are fastened in the free space (12) at a facing side of the frame leg (11).

11. In the switchgear cabinet in accordance with claim 10, wherein the first folded section (22) of the edges of the panel elements (20, 20') comprises several folded sections.

12. In the switchgear cabinet in accordance with claim 10, wherein at free ends the end folded sections (23) are bent toward the associated panel elements (20, 20').

* * * * *